United States Patent [19]
Dechant

[11] Patent Number: 5,615,814
[45] Date of Patent: Apr. 1, 1997

[54] EQUIPMENT CARRIER ASSEMBLY FOR MOUNTING TO SNOWPLOW MOUNTING BRACKET

[76] Inventor: George A. Dechant, Rte. 3, Box 29, Stafford, Kans. 67578

[21] Appl. No.: 546,589

[22] Filed: Oct. 23, 1995

[51] Int. Cl.⁶ .................. B60R 9/00; B60R 11/00
[52] U.S. Cl. .................. 224/488; 224/495; 224/502; 224/512; 224/513; 224/282; 37/231; 37/270; 414/686
[58] Field of Search ................ 224/488, 495, 224/499, 502, 512, 513, 282, 524, 525, 526; 37/231, 235, 236, 241, 270; 296/37.6; 414/462, 685, 686

[56] References Cited

U.S. PATENT DOCUMENTS

| | | | |
|---|---|---|---|
| 2,819,874 | 1/1958 | Belec | 254/166 |
| 3,034,237 | 5/1962 | Wolfe et al. | 37/117.5 |
| 3,065,556 | 11/1962 | Kampert | 37/117.5 |
| 3,605,906 | 9/1971 | Coates | 172/272 |
| 3,900,072 | 8/1975 | Knight | 172/238 |
| 4,421,449 | 12/1983 | Cotton | 37/241 |
| 4,625,988 | 12/1986 | Witchey et al. | 280/461 A |
| 4,976,053 | 12/1990 | Caley | 37/231 |
| 5,094,019 | 3/1992 | DeVincenzo | 37/197 |
| 5,275,314 | 1/1994 | Todenhagen | 224/42.01 |
| 5,467,910 | 11/1995 | Ritter et al. | 224/282 |

FOREIGN PATENT DOCUMENTS 2170460  8/1986  United Kingdom .............. 224/524

*Primary Examiner*—Henry J. Recla
*Assistant Examiner*—Timothy L. Maust
*Attorney, Agent, or Firm*—John R. Flanagan

[57] ABSTRACT

An equipment carrier assembly for mounting to a snowplow mounting bracket includes at least one and preferably a pair of carrier stands each including a lower platform for supporting equipment thereon and an upright mast mounted to and extending upwardly from the lower platform for attaching equipment thereto, a lower shaft latching mechanism attached on and extending between the lower platforms of the carrier stands for mounting the carrier stand to the snowplow mounting bracket, and upper slide locking mechanisms on the upright masts of the carrier stands for securing the carrier stands to the snowplow mounting bracket. The carrier stands of the assembly may be intercoupled to one another by components attached to and extending respectively between the lower platforms and upper masts of the carrier stands. The equipment carrier assembly may also include a carrier tray removably mountable upon the lower shaft latching mechanism and the lower intercoupling components for attaching the carrier tray to either one or to the pair of carrier stands for retaining equipment thereon.

21 Claims, 3 Drawing Sheets

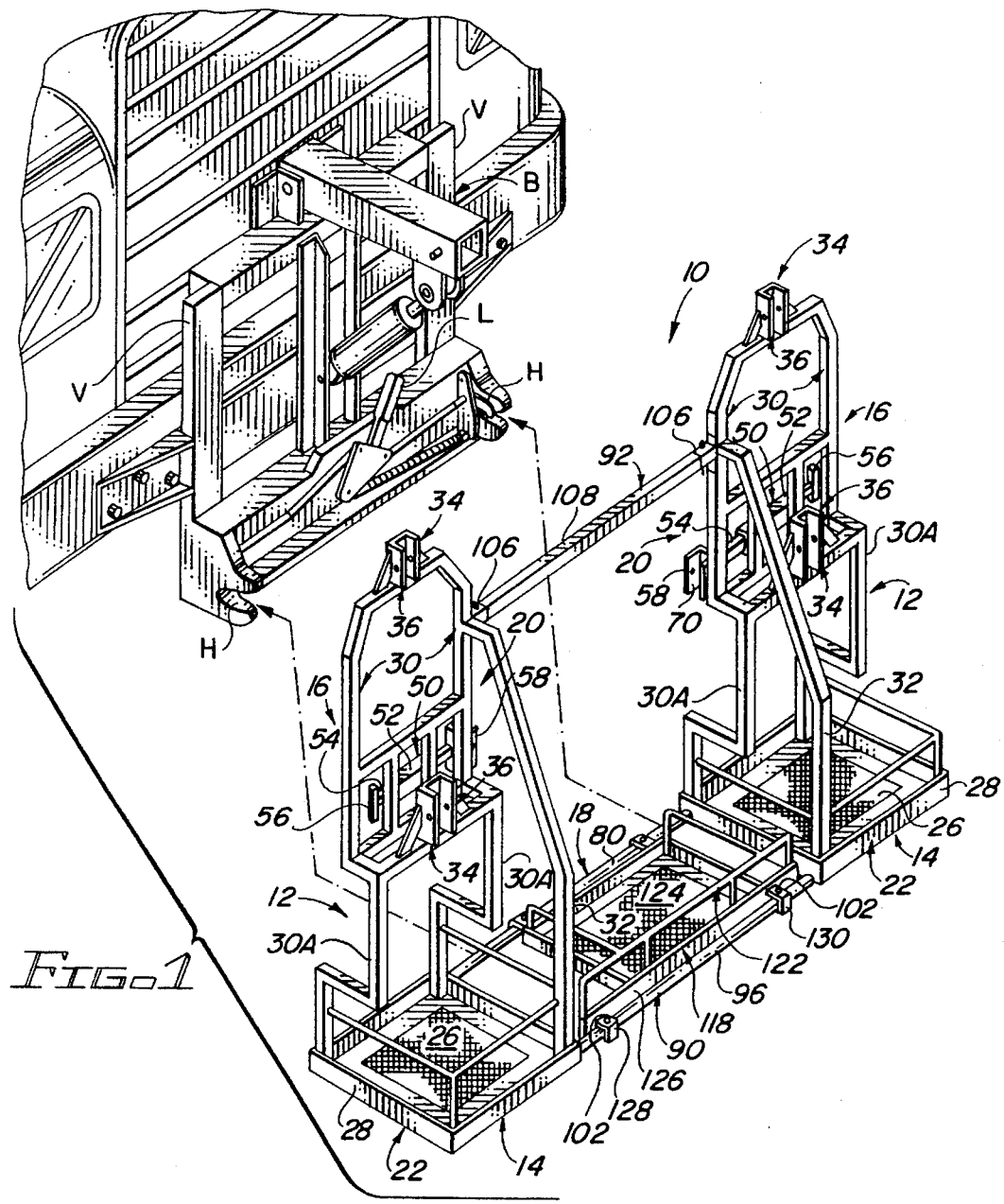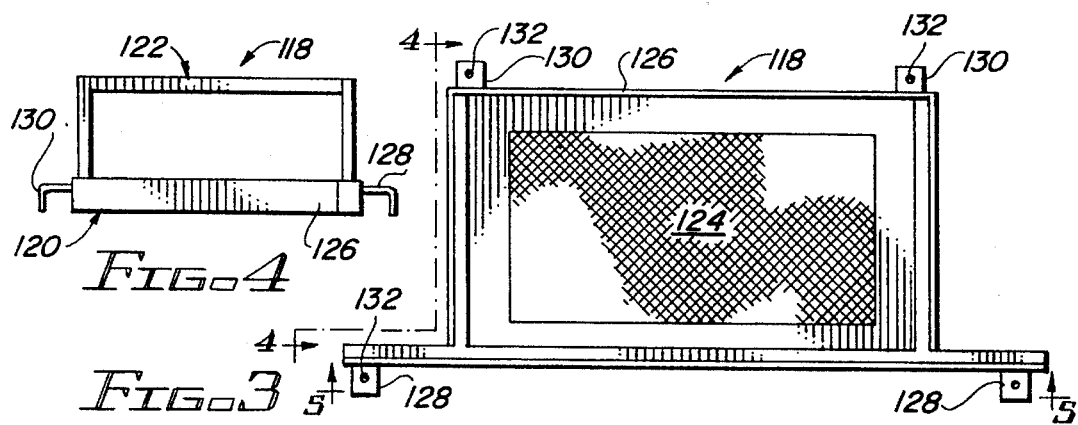

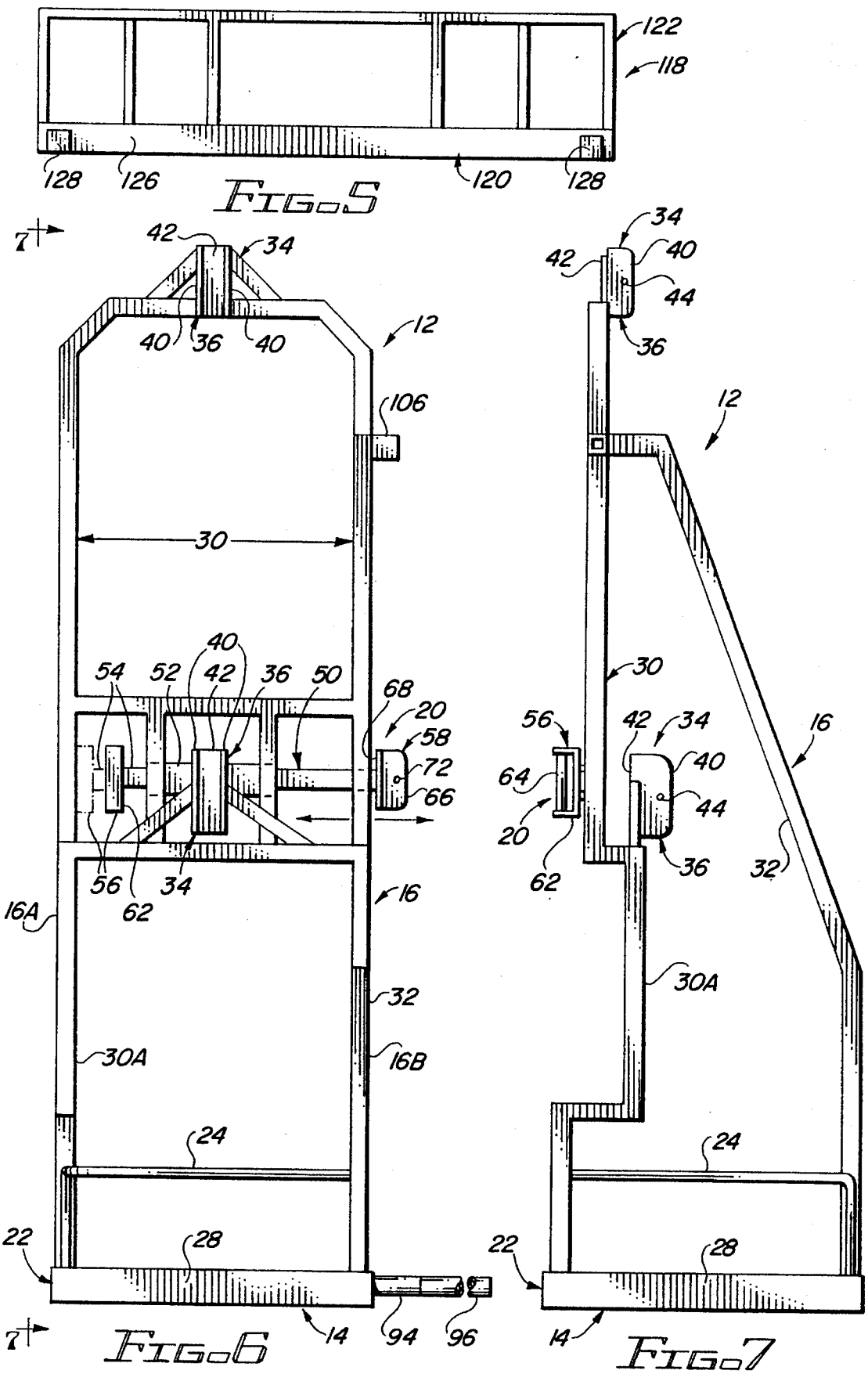

EQUIPMENT CARRIER ASSEMBLY FOR MOUNTING TO SNOWPLOW MOUNTING BRACKET

BACKGROUND OF THE INVENTION

1. Field of the Invention

The present invention generally relates to devices for transporting construction and maintenance items and, more particularly, is concerned with an equipment carrier assembly for mounting to a snowplow mounting bracket.

2. Description of the Prior Art

Construction and maintenance crews working on roads and other projects often find it necessary to transport items to and from their work site. These items are often placed loosely in the back of trucks or are otherwise not properly secured for transport. As a result, items can be lost en route, which unnecessarily adds to the costs and inefficiency in construction and maintenance work.

A variety of devices have been developed over the years which provide various attachments or devices for receiving various attachments such as snowplows and the like for motor vehicles. Representative examples are disclosed in U.S. Pat. No. 2,819,874 to Belec, U.S. Pat. No. 3,034,237 to Wolfe et al., U.S. Pat. No. 3,065,556 to Kampert, U.S. Pat. No. 3,605,906 to Coates, U.S. Pat. No. 3,900,072 to Knight, U.S. Pat. No. 4,421,449 to Cotton, U.S. Pat. No. 4,625,988 to Witchey et al., U.S. Pat. No. 4,976,053 to Caley, U.S. Pat. No. 5,094,019 to DeVincenzo and U.S. Pat. No. 5,275,314 to Todenhagen.

These prior art devices, however, seem only to be dedicated to the single use disclosed and do not appear to be employed for other uses such as for transporting the various items which are needed by construction and maintenance crews to make it convenient and easy for them to efficiently carry out their work.

Consequently, a need still exists for a device which overcomes the aforementioned need remaining in the prior art without introducing any new problems in their place.

SUMMARY OF THE INVENTION

The present invention provides an equipment carrier assembly for mounting to a snowplow mounting bracket designed to satisfy the aforementioned need in the prior art. The equipment carrier assembly of the present invention makes it convenient and easy for construction and maintenance crews to safely transport the various items which they need to efficiently carry out their work. The equipment carrier assembly provides an alternative to placing items loosely in the back of trucks or otherwise not properly securing items for transport. The equipment carrier assembly further has the advantage of reducing the risk of injury to the back of the worker by reducing the height to which the crew member must lift items into and out from their storage location.

The inventor herein is first to recognize a use for a snowplow mounting bracket which has not been disclosed by the prior art. The bracket can be used for mounting a snowplow thereon for plowing snow during winter months and for mounting the equipment carrier assembly of the present invention thereon for carrying items used in construction and maintenance work during the spring, summer and fall months. The equipment carrier assembly therefore allows for year-round use of snowplow mounting brackets.

Accordingly, the present invention is directed to an equipment carrier assembly for mounting to a snowplow mounting bracket. The assembly comprises: (a) at least one and preferably a pair of carrier stands, each carrier stand including a lower platform for supporting equipment thereon and an upright mast mounted to and extending upwardly from the lower platform for attaching equipment thereto; (b) lower mounting means on the lower platform of each of the stands for mounting the stands to the snowplow mounting bracket; and (c) upper securing means on the upright mast of each of the stands for securing the stands to the snowplow mounting bracket.

More particularly, the upper securing means on the upright mast of each of the carrier stands is a slide locking mechanism mounted to a rear side of the upright mast of the stand for securing the carrier stand to the snowplow mounting bracket. The slide locking mechanism includes a mounting sleeve attached to the rear side of the upright mast, a rod slidably fitting through the sleeve, a handle attached at one end of the rod, a clevis attached at an opposite end of the rod from the one end with the handle, with the clevis interfitting with a respective one of the opposite vertical side edges of the snowplow mounting bracket, and retaining means for releasably securing the clevis to the snowplow mounting bracket. The retaining means includes means defining respective holes in the clevis and snowplow mounting bracket being alignable with one another, and a lock pin removably insertable through the holes when the holes are aligned.

The lower mounting means on the lower platform of each of the stands is a shaft latching mechanism mounted to a rear corner of an inner side of the lower platform of the stand and extending outwardly therefrom for mounting the stand to the bracket. The shaft latching mechanism includes a pair of rear shaft members each mounted to an inner side of the lower platform of one of the carrier stands and extending outwardly therefrom toward the other rear shaft member, a rear elongated tubular member for interfitting with each of the rear shaft members and for mounting the carrier stand to the snowplow mounting bracket, and a lower rear fastening means for releasably securing the rear elongated tubular member to each of the rear shaft members. The lower rear fastening means includes means defining respective holes in the rear elongated tubular member and the rear shaft members which holes are alignable with one another, and a lock pin removably insertable through the holes when the holes are aligned.

Furthermore, in accordance with the present invention, when a pair of the carrier stands of the equipment carrier assembly are mounted to the snowplow mounting bracket, they are preferably intercoupled with one another. Thus, the equipment carrier assembly further includes lower and upper intercoupling means for intercoupling the carrier stands together. The lower intercoupling means includes a pair of front shaft members each mounted to an inner side of the lower platform of one of the stands and extending outwardly therefrom toward one another, a front elongated tubular member for interfitting with each of the front shaft members for intercoupling the pair of stands, and a lower front fastening means for releasably securing the front elongated tubular member to each front shaft member. The lower front fastening means includes means defining respective holes in the front elongated tubular member and in each of the front shaft members and being alignable with one another, and a lock pin removably insertable through the holes when they are aligned.

The upper intercoupling means includes a socket tube mounted to an inner side and adjacent to an upper end of the upright mast of each of the carrier stands, an elongated tubular link for extending between and interfitting at opposite ends with each of the socket tubes for intercoupling the pair of stands, and an upper fastening means for releasably securing the elongated tubular link to each of the socket tubes. The upper fastening means includes means defining respective holes in the elongated tubular link and the socket tubes and being alignable with one another, and a lock pin removably insertable through the holes when the holes are aligned.

Finally, in accordance with the present invention, the equipment carrier assembly may also include a carrier tray removably mountable upon the rear and front elongated tubular members between the pair of stands for retaining equipment thereon. The carrier tray may be attached to either one or to the pair of stands but in either situation must be mounted upon the rear and front elongated tubular members.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a front perspective view of a equipment carrier assembly of the present invention, showing an intercoupled pair of carrier stands for mounting to a snowplow mounting bracket.

FIG. 3 is an enlarged top plan view of a carrier tray also of the present invention removably mountable between the carrier stands of the equipment carrier assembly.

FIG. 4 is a side elevational view, on a reduced scale, of the carrier tray as seen along line 4—4 of FIG. 3.

FIG. 5 is a front elevational view of the carrier tray as seen along line 5—5 of FIG. 3.

FIG. 6 is an enlarged front elevational view of one of the carrier stands of the equipment carrier assembly of the present invention.

FIG. 7 is a side elevational view of the carrier stand as seen along line 7—7 of FIG. 6.

DETAILED DESCRIPTION OF THE INVENTION

Figure 2:
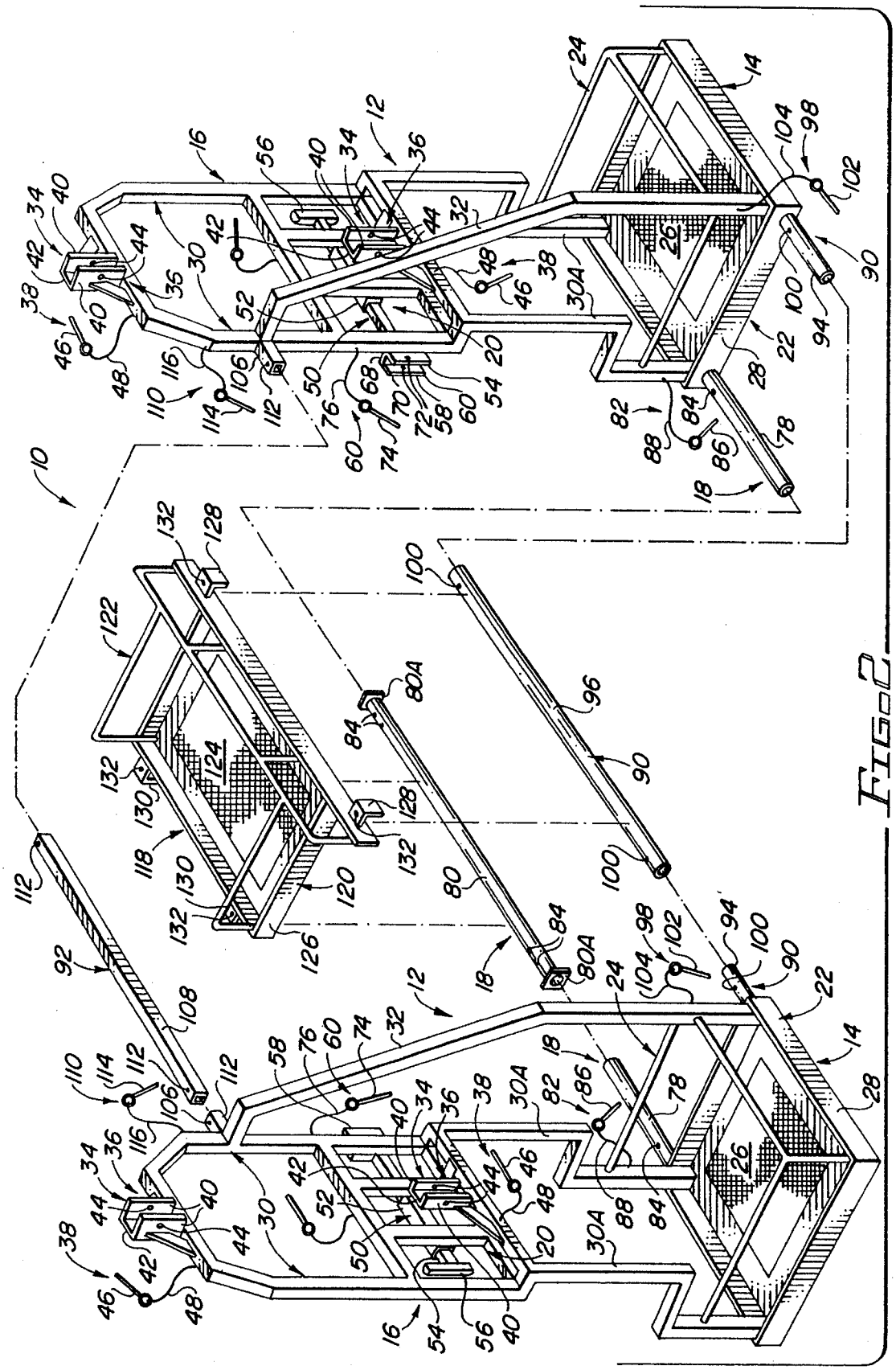
FIG. 2 is an enlarged exploded perspective view of the equipment carrier assembly.

Referring to the drawings and particularly to FIGS. 1 and 2, there is illustrated an equipment carrier assembly, generally designated 10, of the present invention, for mounting to a snowplow mounting bracket B to conveniently, easily and safely transport various items, such as weed trimmers, shovels, rakes, buckets of paint and the like, which are needed by construction and maintenance crews to carry out their work in an efficient manner. The equipment carrier assembly 10 of the present invention provides an alternative to placing these items loosely in the back of trucks or otherwise not properly securing items for transport, and so has the advantage of reducing the risk of injury to the back of the worker by reducing the height to which the worker must lift items into and out from their storage location.

Basically, the equipment carrier assembly 10 includes at least one and preferably a pair of carrier stands 12 and various means for mounting the stands 12 to the snowplow mounting bracket B. Each of the carrier stands 12 includes a lower platform 14 adapted to support various items of equipment thereon and an upright mast 16 mounted to and extending upwardly from the lower platform 14 for attaching the various items of equipment thereto. The various means are provided for mounting the carrier stands 12 to the snowplow mounting bracket B, including lower mounting means 18 attached on and extending between the lower platforms 14 of the stands 12 for mounting the equipment carrier assembly 10 to the snowplow mounting bracket B and upper securing means 20 attached on and extending between the upright masts 16 of the stands 12 for securing the stands 12 to the snowplow mounting bracket B.

The lower platform 14 of each carrier stand 12 particularly has a lower base portion 22 and an upper lateral confinement portion 24. The lower base portion 22 is preferably although not necessarily substantially rectangular in shape with a flat bottom 26 and an upright wall 28 which is continuous about the periphery of the lower base portion 22. The flat bottom 26 of the lower base portion 22 has a screen-like construction defining a plurality of perforations which permit water to pass downward therethrough so that the lower platform 14 does not collect rainwater thereon and which provide a gripping surface for items which are placed on the lower platform 14. The upper lateral confinement portion 24 is preferably in the form of a railing framework 24 which extending upwardly from the lower base portion 22 and provides confinement and support around the periphery of the lower platform 14 so as to confine and support items placed thereon. The railing framework 24 is interconnected to the flat bottom 26 and the continuous peripheral wall 28 of the lower base portion 22 of the lower platform 14. As one example, the railing framework 24 may be fabricated from one-half inch square tube.

The upright mast 16 preferably is in the form of an upright framework which provides support for items placed on the lower platform 14. To properly perform its function, the framework of the upright mast 16 includes a rear upright brace 30, a lateral brace 32 and equipment holding mechanisms 34. The rear upright brace 30 has a substantially inverted U-shaped configuration with a lower forwardly offset portion 30A to accommodate a front bumper of the truck to which the snowplow mounting bracket B is attached. The lateral brace 32 extends between and is rigidly attached to an upper inside portion of the rear upright brace 30 and a lower front inside corner of the lower platform 14. The equipment holding mechanisms 34 each includes respective upper and lower vertical channels 36 disposed in substantially vertical alignment with one another for receiving therethrough parts of the equipment being carried on the stands 12, such as an elongated handle, and coupling means 38 for securing the equipment handle within each of the channels 36. Each channel 36 is formed by a pair of opposite vertical side walls 40 interconnected with a vertical rear wall 42 extending perpendicular thereto. Each coupling means 38 includes respective holes 44 defined in the opposite side walls 40 and aligned with one another and a lock pin 46 removably insertable through the holes 44. The lock pin 46 further has a cable lanyard 48 attached thereto and extending from and attached to the rear brace 30 of the upright mast 16 to keep the lock pin 46 from becoming lost.

Referring now to FIGS. 1, 2, 6 and 7, the upper securing means 20 on the upright mast 16 of each carrier stand 12 is a slide locking mechanism 50 mounted to a rear side of the upright mast 16 for securing the stand 12 to the snowplow mounting bracket B. Each slide locking mechanism 50 includes a mounting sleeve 52 attached to the rear brace 30 of the upright mast 16, a rod 54 slidably fitted through the sleeve 52, a handle 56 attached at a first end of the rod 54, a clevis 58 attached at a second end of the rod 54 opposite from the first end thereof. The clevis 58 interfits with one of the opposite vertical side edge V of the snowplow mounting bracket B, and a retaining means 60 is provided for releasably retaining the clevis 58 to the snowplow mounting bracket B.

The mounting sleeve 52 is disposed rearwardly of and fixedly attached to the rear side of the rear brace 30 of the upright mast 16. The sleeve 52 is preferably although not necessarily rectangular in shape and has a pair of opposite open ends and is hollow so as to permit the rod 54 to slidably pass therethrough in both directions. The rod 54 likewise is preferably although not necessarily rectangular in shape and has a cross-sectional size slightly smaller than that of the sleeve 52 for permitting slidably fitting of the rod 54 therethrough. As one example, the rod 54 may be fabricated from one inch square tube which has been shimmed on front and rear sides thereof so that it will slide snugly through the sleeve 52. Also, as one example, the handle 56 is formed by a U-shaped flat bar 62 and a cylindrical bar 64 which extends between and is connected to the opposite ends thereof. The handle 56 extends in a substantially perpendicular relation to the first end of the rod 54 and is preferably removably fastened thereto so that the handle 56 can be removed from the rod 54 when it is desired to remove the rod 54 from the sleeve 52 should the rod 54 ever need to be replaced. The clevis 58 has a pair of opposite parallel spaced apart vertical side walls 66 being interconnected with a vertical end wall 68 which is attached to the second end of the rod 54 and extends in a substantially transverse relation thereto. The side walls 66 and end wall 68 together form a pocket 70 open along the top, bottom and outer end for releasably receiving a respective one of the vertical side edges V of the snowplow mounting bracket B. The retaining means 60 includes respective holes 72 formed in the clevis 58 and the respective one of the vertical side edges V of the snowplow mounting bracket B being alignable with one another and a lock pin 74 removably insertable through the holes 72 when the holes 72 are aligned. The retaining means 60 further includes a cable lanyard 76 attached to the lock pin 74 and to and extending from the upright mast 16 to keep the lock pin 74 from becoming lost.

The slide locking mechanism 70 is further movable between an unlocked position and a locked position away from and toward the respective one of the vertical side edges V of the snowplow mounting bracket B. In the unlocked position shown in dashed line form in FIG. 6, the handle 56 on the rod 54 is pulled outwardly relative to the sleeve 52 to adjacent to an outside edge 16A of the upright mast 16 and the clevis 58 is retracted inwardly from an inside edge 16B of the upright mast 16. In the locked position shown in solid line form in FIG. 6, the handle 56 on the rod 54 is pushed inwardly from the outside edge 16A of the upright mast 16 and the clevis 58 is extended outwardly past the inside edge 16B of the upright mast 16 and receives the respective one of the vertical side edges V of the snowplowing mounting bracket B in the pocket 70 of the clevis 58. The slide locking mechanism 50 provides added safety to assure that the carrier stand 12 remains secured to the snowplow mounting bracket B in the event a trip lever L on the bracket B accidentally opens up and thereby releases from the lower mounting means 18 of the carrier assembly 10.

The lower mounting means 18 attached and extending between the lower platforms 14 of the carrier stands 12 is in the form of a shaft latching mechanism 18 mounted to each of the rear corners at inner sides 14A of the respective lower platforms 14 of the stands 12 and extending outwardly therefrom and between the stands 12 for mounting the carrier stands 12 to the snowplow mounting bracket B. The shaft latching mechanism 18 includes a pair of rear shaft members 78 each mounted to the rear corner of the inner side 14A of the lower platform 14 of one of the stands 12 and extending outwardly therefrom, a rear elongated tubular member 80 removably interfitting with the rear shaft members 78 and for mounting the carrier stands 12 to the snowplow mounting bracket B, and a pair of lower rear fastening means 82 for releasably securing the opposite ends of the rear enlongated tubular member 80 to the rear shaft members 78.

Each of the rear shaft members 78 and the rear elongated tubular member 80 are further preferably although not necessarily cylindrical in shape with the rear elongated tubular member 80 having a diameter slightly greater than the diameters of the respective rear shaft member 78 for fitting the free ends of the rear shaft members 78 through the respective opposite open ends of the rear elongated tubular member 80. The rear elongated tubular member 80 also has an axial length substantially greater than the respective axial lengths of the rear shaft members 78 and long enough to generally extend across the width of the snowplow mounting bracket B so that a pair of latching hooks H located at each end of the bracket B relative to the width thereof may releasably latch around the elongated tubular member 80 so as to mount the carrier stands 12 to the snowplow mounting bracket B. The trip lever L at the bottom of the snowplow mounting bracket B is spring loaded so that when the trip lever L is released and the rear elongated tubular member 80 is inserted, the two latching hooks H rotate forward to capture the rear elongated tubular member 80 and thereby to lock the rear elongated tubular member 80 in place. The rear elongated tubular member 80 further has a pair of square plates 80A fixed at each end to prevent the rear elongated tubular member 80 from sliding out either end of the snowplow mounting bracket B when only one of the carrier stands 12 is mounted thereto. As one example, the rear elongated tubular member 80 is fabricated from one inch high grade structural pipe.

The lower rear fastening means 82 includes respective holes 84 defined in the rear shaft members 78 and rear elongated tubular member 80 which are alignable with one another with the rear tubular member 80 interfitted over the rear shaft members 78, and a lock pin 86 removably insertable through the holes 84 when the holes 84 are aligned. The lower rear fastening means 82 also includes a cable laynard 88 attached to and extending from the upright mast 16 and attached to the lock pin 84 to keep it from becoming lost.

Further, the carrier stands 12 may be intercoupled to one another when mounted together to the snowplow mounting bracket B adjacent to the right and left side edges V thereof. In addition to the above-mentioned components, the carrier stands 12 also have lower and upper intercoupling means 90, 92 for intercoupling the pair of carrier stands 12 together. The lower intercoupling means 90 includes a pair of front shaft members 94 each mounted to a front corner of the inner side 14A of the lower platform 14 of each of the stands 12 and extending outwardly therefrom toward one another, a front elongated tubular member 96 for interfitting at opposite ends thereof with the respective front shaft members 94 for intercoupling the pair of stands 12, a lower front fastening means 98 for releasably securing the front elongated tubular member 96 to each of the front shaft members 94.

The front shaft members 94 and the front elongated tubular member 96 are preferably although not necessarily substantially cylindrical in shape with the front elongated tubular member 96 having a diameter slightly greater than that of each front shaft member 94 for fitting each front shaft member 94 through one of the opposite open ends of the front elongated tubular member 96. Also, the front elongated tubular member 96 has an axial length which is substantially the same as the axial length of the rear elongated tubular member 80 and is substantially greater than the axial lengths of the front shaft members 94. Further, the axial length of each rear shaft member 78 is substantially greater than the axial length of each front shaft member 94 to provide additional support to the lower mounting means 18. As one example, the front elongated tubular member 96 like the rear elongated tubular member 80 is fabricated from one inch high grade structural pipe. The lower front fastening means 98 includes respective holes 100 defined in the front elongated tubular member 96 and in front shaft members 94 and being alignable with one another and a lock pin 102 removably insertable through the holes 100 when the holes 100 are aligned. The lock pin 102 further is attached to a cable lanyard 104 which in turn is attached to and extends from the lateral brace 32 of the upright mast 16 to keep the lock pin 102 from becoming lost.

The upper intercoupling means 92 includes a pair of socket tubes 106 each mounted to an inner side of and adjacent to an upper end of the upright mast 16 of each stand 12, an elongated tubular link 108 for extending between and interfitting at opposite ends with each of the socket tubes 106 for intercoupling the pair of stands 12 together, and an upper fastening means 110 for releasably securing the elongated tubular link 108 to each of the socket tubes 106. Each socket tube 106 and the elongated tubular link 108 are preferably but not necessarily substantially rectangular in shape with each socket tube 106 having a cross-sectional size slightly greater than that of the elongated tubular link 108 for fitting the opposite ends of the elongated tubular link 108 into the open free ends of the respective socket tubes 106. The elongated tubular link 108 has an axial length which is substantially the same as each of the respective axial lengths of the rear and front elongated tubular members 80 and 96 and is substantially greater than the axial length of each socket tube 106. As one example, the elongated tubular link 108 is fabricated from one inch square tube and each socket tube 106 is fabricated from one and a quarter inch square tube. The elongated tubular link 108 is further shimmed at each end so that it fits snugly into each of the socket tubes 106 so as to eliminate any rattling or vibration. The upper fastening means 110 includes respective holes 112 defined in the elongated tubular link 108 and in each of the socket tubes 106 and being alignable with one another and a lock pin 114 removably insertable through the holes 112 when the holes 112 are aligned. The lock pin 114 further is attached to a cable lanyard 116 which in turn is attached to and extends from the upright mast 16 to keep the lock pin 114 from becoming lost.

Referring now to FIGS. 1 to 5, the equipment carrier assembly 10 further includes a carrier tray 118 removably mountable upon the rear and front elongated tubular members 80 and 96 between the pair of stands 12. The carrier tray 118 has a lower base portion 120 and an upper lateral confinement portion 122. The lower base portion 120 is preferably but not necessarily substantially rectangular in shape and has a flat bottom 124 and a peripheral wall 126 which is continuous about the periphery of the lower base portion 120. Front and rear pairs of hook-shaped flat bars 128, 130 are rigidly attached to and extend outwardly from front and rear portions of the continuous peripheral wall 126 for attachment over the rear and front elongated tubular members 80 and 96. The hook-shaped flat bars 128, 130 have holes 132 therein for alignment with holes 84 and 100 of the lower rear and front fastening means 82 and 98 for passage of the lock pins 86 and 102 therethrough for fastening the carrier tray 118 to the rear and front elongated tubular members 80 and 96. The flat bottom 124 of the lower base portion 120 further has a plurality of perforations which permit water to pass therethrough so that the carrier tray 118 does not collect rainwater thereon and which provide a gripping surface for items which are placed on the carrier tray 118. The upper lateral confinement portion 122 is a railing framework 122 which provides confinement and support around the periphery of the carrier tray 118 so as to confine and support items which are placed thereon. As one example, the railing framework 122 is fabricated from one-half inch square tube which is interconnected to the flat bottom 124 and the continuous peripheral wall 126 of the lower base portion 120 of the carrier tray 118. The carrier tray 118 may be attached to either one or to both of the carrier stands 12 but in either situation must be mounted upon the rear and front elongated tubular members 80, 96. All the above-mentioned components of the carrier stands 12 are made of substantially rigid material, such as a suitable metal.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An equipment carrier assembly for mounting to a snowplow mounting bracket, said assembly comprising:
   (a) at least one carrier stand including
      (i) a lower platform for supporting equipment thereon, and
      (ii) an upright mast attached to and extending upwardly from said lower platform for securing equipment thereto;
   (b) lower means on said lower platform of said carrier stand for mounting said carrier stand to the snowplow mounting bracket; and
   (c) upper means on said upright mast of said carrier stand for securing said carrier stand to the snowplow mounting bracket;
   (d) said upper securing means on said upright mast of said carrier stand being a slide locking mechanism mounted to a rear side of said upright mast of said carrier stand for securing said carrier stand to the snowplow mounting bracket, said slide locking mechanism including
      (i) a mounting sleeve attached to said rear side of said upright mast,
      (ii) a rod slidably fitting through said sleeve,
      (iii) a handle attached at one end of said rod,
      (iv) a clevis attached at an opposite end of said rod from said one end with said handle, said clevis interfitting with a side edge of the snowplow mounting bracket, and
      (v) retaining means for releasably securing said clevis to the snowplow mounting bracket.

2. The assembly of claim 1 wherein said retaining means includes:

means defining respective holes in said clevis for aligning with respective holes in the snowplow mounting bracket; and a lock pin for removably inserting through said holes in said clevis when aligned with the holes in the snowplow mounting bracket.

3. The assembly of claim 1 wherein said lower mounting means on said lower platform is a shaft latching mechanism mounted said lower platform of said carrier stand and extending outwardly therefrom for mounting said carrier stand to the snowplow mounting bracket.

4. The assembly of claim 1 wherein said lower platform includes:

a lower base portion; and an upper railing framework portion attached about and extending upwardly from a periphery of said lower base portion for providing confinement and support around said periphery of said lower platform for items placed thereon.

5. The assembly of claim 1 wherein said upright mast includes:

upright framework formed by a rear brace and a lateral brace attached to and extending upwardly from said lower platform for providing support for items placed on said lower platform; and a plurality of holding mechanisms attached to said upright framework for coupling thereto portions of items supported on said lower platform.

6. An equipment carrier assembly for mounting to a snowplow mounting bracket, said assembly comprising:

(a) at least one carrier stand including
   (i) a lower platform for supporting equipment thereon, and
   (ii) an upright mast attached to and extending upwardly from said lower platform for securing equipment thereto;

(b) lower means on said lower platform of said carrier stand for mounting said carrier stand to the snowplow mounting bracket; and (c) upper means on said upright mast of said carrier stand for securing said carrier stand to the snowplow mounting bracket;

(d) said lower mounting means on said lower platform being a shaft latching mechanism mounted to said lower platform of said carrier stand and extending outwardly therefrom for mounting said carrier stand to the snowplow mounting bracket, said shaft latching mechanism including
   (i) a rear shaft member attached to and extending outwardly from an inner side of said lower platform of said carrier stand,
   (ii) a rear elongated tubular member removably interfitted with said rear shaft member and extending outwardly therefrom for mounting to the snowplow mounting bracket, and
   (iii) a lower rear fastening means for releasably securing said rear enlongated tubular member to said rear shaft member.

7. The assembly of claim 6 wherein said lower rear fastening means includes:

means defining respective holes in said rear elongated tubular member and said rear shaft member being alignable with one another; and a lock pin removably inserted through said holes in said rear elongated tubular member and rear shaft member when said holes are aligned with one another.

8. The assembly of claim 6 wherein said upper securing means on said upright mast of said carrier stand is a slide locking mechanism mounted to a rear side of said upright mast of said carrier stand for securing said carrier stand to the snowplow mounting bracket.

9. The assembly of claim 8 wherein said slide locking mechanism includes:

a mounting sleeve attached to said rear side of said upright mast;

a rod slidably fitting through said sleeve;

a handle attached at one end of said rod;

a clevis attached at an opposite end of said rod from said one end with said handle, said clevis interfitting with a side edge of the snowplow mounting bracket; and retaining means for releasably securing said clevis to the snowplow mounting bracket.

10. An equipment carrier assembly for mounting to a snowplow mounting bracket, said assembly comprising:

(a) a pair of right and left carrier stands, each of said carrier stands including
   (i) a lower platform for supporting equipment thereon, and
   (ii) an upright mast attached to and extending upwardly from said lower platform for securing equipment thereto;

(b) a pair of slide locking mechanisms each mounted to a rear side of said upright mast of a respective one of said carrier stands for securing said respective carrier stands to the snowplow mounting bracket;

(c) a shaft latching mechanism mounted to an inner side of said lower platform of each of said carrier stands and extending outwardly therefrom toward one another for mounting said respective carrier stands to the snowplow mounting bracket;

(d) lower means for intercoupling said carrier stands; and (e) upper means for intercoupling said carrier stands.

11. The assembly of claim 10 wherein said slide locking mechanism includes:

a mounting sleeve attached to said rear side of a respective one of said upright masts;

a rod slidably fitting through said sleeve;

a handle attached at one end of said rod;

a clevis attached at an opposite end of said rod from said one end with said handle, said clevis interfitting with a side edge of the snowplow mounting bracket; and retaining means for releasably securing said clevis to the snowplow mounting bracket.

12. The assembly of claim 11 wherein said retaining means includes:

means defining respective holes in said clevis for aligning with the snowplow mounting bracket; and a lock pin removably inserted through said holes in said clevis when aligned with the snowplow mounting bracket.

13. The assembly of claim 11 wherein said shaft latching mechanism includes:

a pair of rear shaft members each being attached to and extending outwardly from an inner side of said lower platform of a respective one of said carrier stands;

a rear elongated tubular member removably interfitted with each of said rear shaft members and extending therebetween for mounting to the snowplow mounting bracket; and lower rear fastening means for releasably securing said rear elongated tubular member to each of said rear shaft members.

14. The assembly of claim 13 wherein said lower rear fastening means includes:

means defining respective holes in said rear elongated tubular member and each of said rear shaft members and being alignable with one another; and a lock pin removably inserted through said holes in said rear elongated tubular member and rear shaft members when said holes are aligned with one another.

15. The assembly of claim 10 wherein said lower intercoupling means includes:

a pair of front shaft members each being attached to and extending outwardly from an inner side of said lower platform of a respective one of said carrier stands;

a front elongated tubular member removably interfitted with said front shaft members and extending therebetween to intercouple said carrier stands; and lower front fastening means for releasably securing said front elongated tubular member to each of said front shaft members.

16. The assembly of claim 15 wherein said lower front fastening means includes:

means defining respective holes in said front elongated tubular member and each of said front shaft members and being alignable with one another; and a lock pin removably inserted through said holes in said front elongated tubular member and said front shaft members when said holes are aligned with each other.

17. The assembly of claim 16 wherein said upper intercoupling means includes:

a pair of socket tubes each being attached to and extending outwardly from an inner side and adjacent to an upper end of said upright mast of a respective one of said carrier stands;

an elongated tubular link extending between and interfitted with said socket tubes for intercoupling said carrier stands; and upper fastening means for releasably securing said elongated tubular link to each of said socket tubes.

18. The assembly of claim 17 wherein said upper fastening means includes:

means defining respective holes in said elongated tubular link and in each of said socket tubes and being alignable with one another; and a lock pin removably insertable through said holes when said holes are aligned.

a lock pin removably inserted through said holes in said elongated tubular link and said socket tubes when said holes are aligned with each other.

19. The assembly of claim 10 wherein each of said lower platforms includes:

a lower base portion; and an upper railing framework portion attached about and extending upwardly from a periphery of said lower base portion for providing confinement and support around said periphery of said lower platform for items placed thereon.

20. The assembly of claim 10 wherein each of said upright masts includes:

upright framework formed by a rear brace and a lateral brace attached to and extending upwardly from said lower platform for providing support for items placed on said lower platform; and a plurality of holding mechanisms attached to said upright framework for coupling thereto portions of items supported on said lower platform.

21. The assembly of claim 10 further comprising:

a carrier tray removably mountable upon said shaft latching mechanism and lower intercoupling means between said carrier stands for retaining equipment thereon.

\* \* \* \* \*